Figure 1:
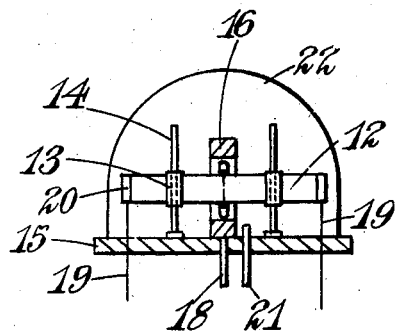

Nov. 22, 1949         C. D. GREAVES ET AL         2,488,624
              METHOD OF JOINING CARBON BODIES
                   Filed Sept. 16, 1947

INVENTOR
C. D. Greaves &
W. D. C. Walker

By Watson, Cole, Grindle & Watson
               Atty.

Patented Nov. 22, 1949

2,488,624

UNITED STATES PATENT OFFICE 2,488,624

METHOD OF JOINING CARBON BODIES

Charles Desmond Greaves and William Derrick Corlass Walker, London, England, assignors to C. D. Patents Limited, London, England, a British company Application September 16, 1947, Serial No. 774,411
In Great Britain July 12, 1946

Section 1, Public Law 690, August 8, 1946
Patent expires July 12, 1966

5 Claims. (Cl. 154—116)

This invention relates to improvements in the method of joining carbon bodies.

It is frequently found necessary to join together units composed substantially of carbon, so as to produce larger structures. Such units are, for example, pipes, flanges, parts of valves, and other components of tubular systems carrying fluids corrosive to material other than carbon. In many cases it is not satisfactory to make the junction of any material other than carbon. Yet carbon junctions present a difficult problem. This element is highly refractory, is not amenable to welding technique, and is moreover oxidized in air at even moderate temperatures. Hitherto it has been usual to incorporate non-carbon parts into the junctions between such carbon units, with corresponding loss of efficiency.

This invention consists of a method of joining separate carbon parts with a carbon bond, by placing together the surfaces which are to be joined and passing an electrical current through them so as to raise the temperature of the joining faces to a bright red heat (about 800° C. or more) in a non-oxidizing atmosphere, and directing a stream or jet of a carbonaceous fluid at the junction, so as to decompose the fluid with the deposition of a bond consisting of a hard strong form of carbon. The expression "carbonaceous fluid" herein used means a fluid the average composition of which contains at least 70% and preferably not less than 85% by weight of carbon, and includes the following: hydrocarbons; distillates from coal tar; crude coal tar, with or without washing; coal tar residues such as pitch; petroleum distillates or residues, preferably those of high carbon content such as asphaltic or pitch-like residues; naturally occurring asphalts which are liquefiable without decomposition; and heterocyclic bodies, such as pyridine, and substituted bodies such as aniline, which melt without decomposition.

Suitable carbonaceous fluids are for example ethylene, benzene, toluene or dicyclo-pentadiene. Unsaturated hydrocarbons or aromatic hydrocarbons are especially suitable carbonaceous fluids, but saturated hydrocarbons may also be used although they may require the use of somewhat higher temperatures.

Figure 2:
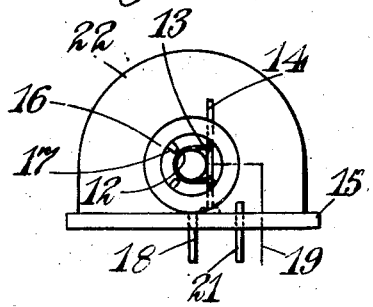

The nature of this invention and the manner in which it is performed will be appreciated from the following description of an example, reference being made to the accompanying drawing in which:

Figure 1 is a diagram in front elevation, and Figure 2 is a diagram in side elevation of a laboratory apparatus for carrying out the method of this invention.

Two carbon tubes 12 of ¾" internal diameter, ⅞" external diameter and 2" long having end faces normal to their axes were placed each in an electrically insulated clamp 13 carried on a stand 14 which supported the tube in a horizontal position at a height of about 2" above the bench 15. The end faces to be joined were brought together within the annular conduit 16 having four radially disposed and equally spaced nozzles 17 projecting inward from the conduit 16 to a distance of about ½" from the junction between the end faces of the carbon tubes 12. The base of the conduit 16 was supported on the bench 15, through which a pipe connection 18 was made to the interior of the conduit 16 from a cylinder of ethylene gas (not shown). Two electrical leads 19, each with a brass clip 20 attached, were taken through the bench 15 to the output side of a transformer (not shown), which gave a current of 200 amps. at 6 volts with the resistance used. The brass clips 20 on the leads 19 were secured one to the extreme end of each carbon tube 12. Near the junction of the end faces a pipe connection 21 was made through the bench to a cylinder of nitrogen (not shown), and the whole area on the bench thus utilized was covered by a bell-jar 22.

The regulator on the nitrogen cylinder was then opened, the volume flow being sufficient to maintain a positive pressure within the bell-jar 22. The electrical current was switched on. When the area at the junction between the end faces of the tubes was heated to bright red heat (about 800° C.), the regulator on the ethylene gas cylinder was opened so that the supply of gas from the nozzles 17 was at a pressure of 3 to 4 lbs. per square inch above that prevailing inside the jar. The ethylene jets thus directed at the junction decomposed rapidly, leaving a bright carbon deposit of graphitic appearance. As the carbon was deposited the resistance at the interface decreased, and the process was concluded when the temperature of the tubes, as judged by the colour, had become uniform along their entire length. When withdrawn after cooling the tubes 12 were united together.

We claim:

1. A method of bonding together separate carbon parts with a bond of carbon which method consists in placing in contact the surfaces to be bonded, surrounding the said surfaces with an atmosphere which does not decompose to liberate carbon and which does not react with carbon at bright red heat, raising the temperature of the carbon surfaces to be bonded to bright red heat by passage of an electric current between the said surfaces and directing at the junction of the carbon parts a stream of carbonaceous fluid which is decomposable at bright red heat to deposit carbon in a hard strong condition and which contains at least 70% by weight of carbon.

2. A method of bonding together separate carbon parts with a bond of carbon which method consists in placing in contact the surfaces to be bonded, surrounding the said surfaces with an atmosphere which does not decompose to liberate carbon and which does not react with carbon at bright red heat, raising the temperature of the carbon surfaces to be bonded to bright red heat by passage of an electric current between the said surfaces and directing at the junction of the carbon parts a stream of carbonaceous liquid which is decomposable at bright red heat to deposit carbon in a hard strong condition and which contains at least 70% by weight of carbon.

3. A method of bonding together separate carbon parts with a bond of carbon which method consists in placing in contact the surfaces to be bonded, surrounding the said surfaces with an atmosphere which does not decompose to liberate carbon and which does not react with carbon at bright red heat, raising the temperature of the carbon surface to be bonded to bright red heat by passage of an electric current between the said surfaces and directing at the junction of the carbon parts a stream of carbonaceous gas which is decomposable at bright red heat to deposit carbon in a hard strong condition, and which contains at least 70% by weight of carbon.

4. A method of bonding together separate carbon parts with a bond of carbon which method consists in placing in contact the surfaces to be bonded, surrounding the said surfaces with an atmosphere which does not decompose to liberate carbon and which does not react with carbon at bright red heat, raising the temperature of the carbon surfaces to be bonded to bright red heat by passage of an electric current between the said surfaces and directing at the junction of the carbon parts a stream of carbonaceous liquid which is decomposable at bright red heat to deposit carbon in a hard strong condition and which contains at least 70% by weight of carbon and is selected from the group consisting of hydrocarbons, heterocyclic compounds and hydrocarbon substitution products.

5. A method of bonding together separate carbon parts with a bond of carbon which method consists in placing in contact the surfaces to be bonded, surrounding the said surfaces with an atmosphere which does not decompose to liberate carbon and which does not react with carbon at bright red heat, raising the temperature of the carbon surfaces to be bonded to bright red heat by passage of an electric current between the said surfaces and directing at the junction of the carbon parts a stream of carbonaceous fluid which is decomposable at bright red heat to deposit carbon in a hard strong condition, the said fluid containing 85% upwards by weight of carbon.

CHARLES DESMOND GREAVES.
WILLIAM DERRICK CORLASS WALKER.

REFERENCES CITED

The following references are of record in the file of this patent:

UNITED STATES PATENTS

| Number | Name | Date |
|---|---|---|
| 363,909 | Pauthonier | May 31, 1887 |
| 2,188,121 | Smith | Jan. 23, 1940 |
| 2,272,342 | Hyde | Feb. 10, 1942 |